United States Patent [19]

Knoblauch et al.

[11] Patent Number: 5,080,694
[45] Date of Patent: Jan. 14, 1992

[54] PROCESS FOR HELIUM RECOVERY

[75] Inventors: Karl Knoblauch, Essen; Erwin Pilarczyk, Bottrop; Klaus Glessler, Gelsenkirchen; Hans Bukowski, Essen, all of Fed. Rep. of Germany; Joseph S. D'Amico, Baltimore; Herbert Reinhold, Annapolis, both of Md.

[73] Assignee: Bergwerksverband GmbH, Essen, Fed. Rep. of Germany

[21] Appl. No.: 445,711

[22] PCT Filed: May 19, 1988

[86] PCT No.: PCT/EP88/004440

§ 371 Date: Nov. 17, 1989

§ 102(e) Date: Nov. 17, 1989

[87] PCT Pub. No.: WO88/09305

PCT Pub. Date: Dec. 1, 1988

[30] Foreign Application Priority Data

May 20, 1987 [DE] Fed. Rep. of Germany ....... 3716899

[51] Int. Cl.$^5$ .............................................. B01D 53/04
[52] U.S. Cl. ............................................. 55/26; 55/58;
55/62; 55/66; 55/74; 55/75
[58] Field of Search ................... 55/25, 26, 58, 62, 66,
55/68, 74, 75

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/26 |
| 3,636,679 | 1/1972 | Batta | 55/62 X |
| 3,738,087 | 6/1973 | McCombs | 55/58 |
| 3,923,477 | 12/1975 | Armond et al. | 55/58 X |
| 4,077,779 | 3/1978 | Sircar et al. | 55/25 |
| 4,444,572 | 4/1984 | Avon et al. | 55/26 |
| 4,477,265 | 10/1984 | Kumar et al. | 55/26 |
| 4,790,858 | 12/1988 | Sircar | 55/58 X |
| 4,892,565 | 1/1990 | Schmidt et al. | 55/62 X |
| 4,913,709 | 4/1990 | Kumar | 55/26 |
| 4,914,218 | 4/1990 | Kumar et al. | 55/26 |

FOREIGN PATENT DOCUMENTS

| | | |
|---|---|---|
| 0071553 | 2/1983 | European Pat. Off. . |
| 0092695 | 11/1983 | European Pat. Off. . |
| 0112640 | 7/1984 | European Pat. Off. . |
| 2504653 | 11/1975 | Fed. Rep. of Germany . |
| 3122701 | 12/1982 | Fed. Rep. of Germany . |
| 3132758 | 3/1983 | Fed. Rep. of Germany . |

OTHER PUBLICATIONS

Bulletin 675 Helium-1985 U.S. Department of Interior, A Chapter from Mineral Facts and Problems.
Chemical Abstracts, vol. 92, No. 14 -Apr. 1980, 92:11309a (p. 127).

Primary Examiner—Robert Spitzer
Attorney, Agent, or Firm—Herbert Dubno

[57] ABSTRACT

A method is provided for the extraction of hellium of high purity, and high yield, with intermediate enrichment in refrigerating plants, from gases containing very low helium concentrations, by an alternating pressure adsorption process. the helium containing gas is fed cyclically in each of three adsorption stages into four adsorbers connected in parallel. First, higher hydrocarbons and other impurities are trapped in adsorbers (J, K, L, M) filled with activated charcoal in a preliminary filtering stage. Other gaseous components, for example nitrogen and/or methane are trapped in adsorbers (A, B, C, D and E, F, G, H) filled with carbon molecular sieves, in two subsequent adsorption stages. The helium is first enriched in stage (I) and then extracted in stage (II) as refined helium with a helium content of 99.9%. The gas used is preferably natural gas with a 2 to 10% helium content. The refined helium so produced can be used, for example as a blanket gas, a breathing gas for divers, a balloon gas and as a carrier gas in chromatography.

11 Claims, 8 Drawing Sheets

FIG.4

| PHASE → | A | | | | | | | | | | | | B | C | D ← ADSORBER |
|---|---|---|---|---|---|---|---|---|---|---|---|---|---|---|---|
| TIME SEQUENCE → | 1 | 2 | 3 | 4 | 5 | 6 | 7 | 8 | 9 | 10 | 11 | 12 | | | |
| | z1 | z2 | z3 | z1 | z2 | z3 | z1 | z2 | z3 | z1 | z2 | z3 | | | |
| | ADSORPTION | | | Da1 | ⊠ | Da2 | Da2·GEE | Ev. | ·DA1 | z1·DA2 | GEE | ·DA1 | DA3 | | |
| | DA2 | DA3 | ·DA1 | ·DA2 | ADSORPTION | | | ⊠ | ·Da1 | ·DA2 | GEE | Ev. | DA1 | ·Da2 | |
| VALVE | GEE | Ev. | ·Da2 | GEE | Ev. | DA 3 | ·DA1 | ADSORPTION | | | | | | | |
| ↓ | Da1 | ⊠ | | | | | ADSORPTION | | | | | | | | |
| 10 | • | | | | | | | | | | | | | | |
| 20 | | • | | | | | | | | | | | | | |
| 30 | | | • | | | | | | | | | | | | |
| 40 | | | | • | | | | | | | | | | | |
| 11 | | | • | • | | | | | | | | | | | |
| 21 | | | | | • | | | | | | | | | | |
| 31 | | | | | | • | | | | | | | | | |
| 41 | | | | | | | • | | | | | | | | |
| 12 | | | | | | • | • | | | | | | | | |
| 22 | | | | | | | | • | | | | | | | |
| 32 | | | | | | | | | • | | | | | | |
| 42 | | | | | | | | | | • | | | | | |
| 13 | | | | | | | | | • | • | | | | | |
| 23 | | | | | | | | | | | • | | | | |
| 33 | | | | | | | | | | | | • | | | |
| 43 | | | | | | | | | | | | | • | | |
| 14 | • | | | | | | | | | | | | • | | |
| 24 | | • | | | | | | | | | | | | | |
| 34 | | | | • | | | | | | | | | | | |
| 44 | | | | | | • | | | | | | | | | |
| 15 | | • | | | • | | | • | | | • | | | | |
| 25 | • | | | • | | | • | | | • | | | | | |
| 35 | | | • | | | • | | | • | | | • | | | |
| 45 | • | | | • | | | • | | | • | | | • | | |
| 50 | | • | | | • | | | • | | | • | | | | |
| 50 | | | • | | | • | | | • | | | • | | | |

DA1/2 — PRESSURE COMPENSATION ($p\uparrow$)

Da1/2 — PRESSURE COMPENSATION ($p\downarrow$)

DA3 — PRESSURE BUILD-UP WITH PRODUCT GAS

GEE — COUNTERFLOW RELIEF

Ev. — EVACUATION

⊠ — STAND BY

• — VALVE OPENED

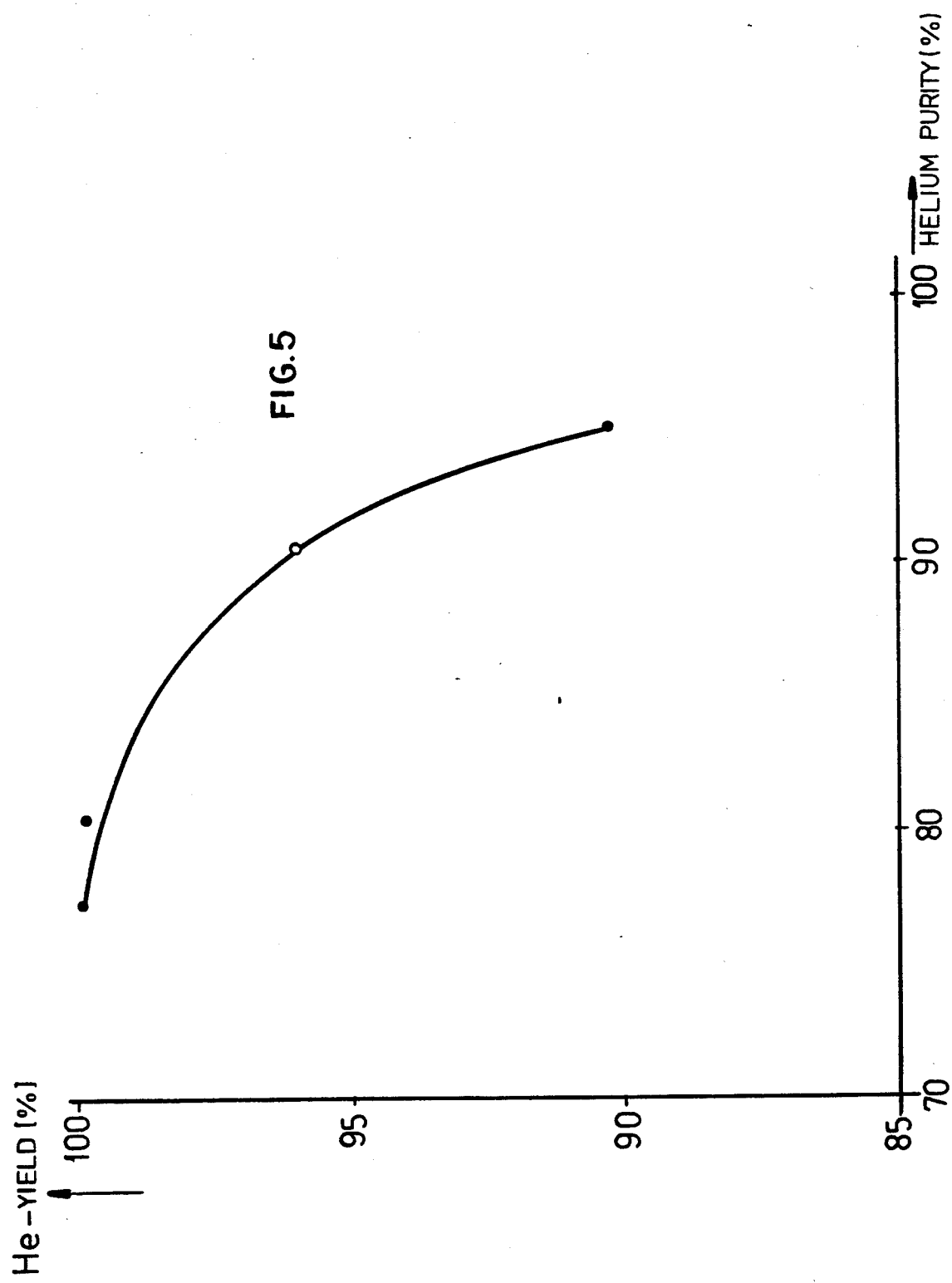

| T 1.2 | T 2.2 | T 3.2 | T 4.2 | T 5.2 | T 6.2 | ADSORBER E |
| T 5.2 | T 6.2 | T 1.2 | T 2.2 | T 3.2 | T 4.2 | | ADSORBER F |
| T 4.2 | | T 5.2 | T 6.2 | T 1.2 | T 2.2 | T 3.2 | ADSORBER G |
| T 2.2 | T 3.2 | T 4.2 | | T 5.2 | T 6.2 | T 1.2 | ADSORBER H |
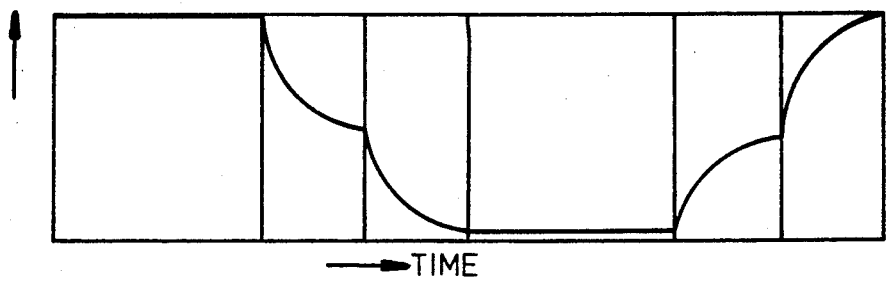
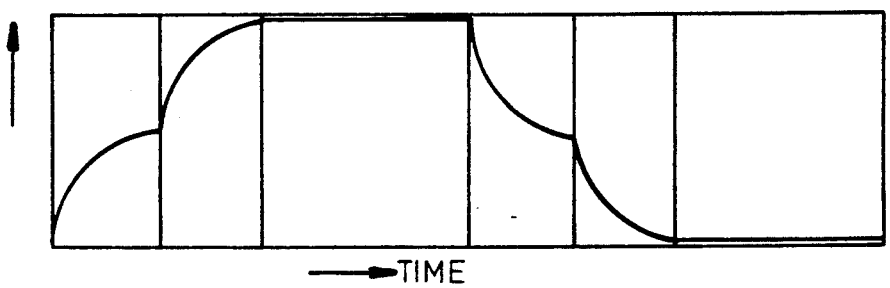
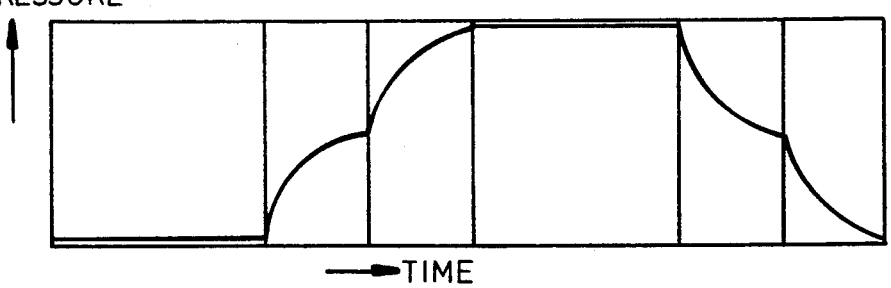
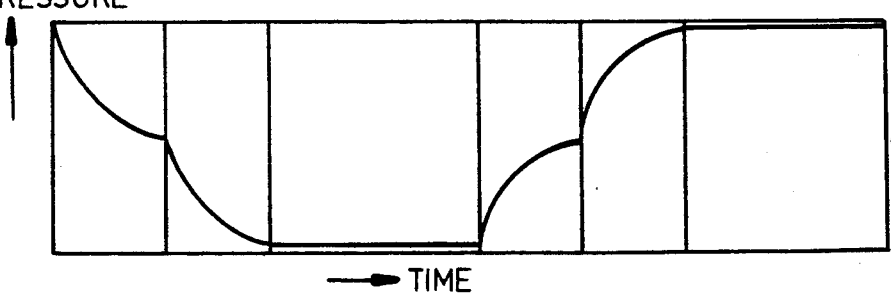
FIG. 7

PROCESS FOR HELIUM RECOVERY

CROSS REFERENCE TO RELATED APPLICATIONS

This application is a National Phase application of PCT/EP88/00440 filed 19 May 1988 and based upon German application P 37 16 899.1 filed 20 May 1987 under the International Convention.

FIELD OF THE INVENTION

The invention relates to a method of helium recovery, according to a pressure swing adsorption process.

THE RELATED ART

EP 0 92 695 discloses a pressure swing adsorption process for the purification of helium. Reportedly therein helium with a purity of over 99.9% by volume can be recovered by using carbon molecular sieves starting with a mixture containing helium and consisting essentially of nitrogen, argon and oxygen, as well as smaller fractions of carbon dioxide and methane. However, the initial gas mixture in this process has already a content of 50 to 95% by volume helium. This process is not suitable for gas mixtures containing only up to 10% helium.

Furthermore, it is known from EP-A-0 112 640, that higher degrees of argon purity can be achieved, when the gas enriched in a first adsorption stage is again dissociated in a subsequent adsorption stage. According to this document, the adsorbers work also based on the known principle of the pressure swing adsorption process, for instance with four adsorbers in each stage and with carbon molecular sieves with a mean adsorption pore diameter of 0.3 nm. The waste gas of one can be recycled into the feed gas of a preceding stage.

Finally, from DE-A-3 132 758 and EP-A-0 071 553, it is known to use adsorbers filled with activated carbon as a prefiltering stage, in order to remove higher-molecular hydrocarbons, as well as other possible contaminants from a helium-containing gas mixture.

High purity helium is increasingly in demand for several applications, e.g. refrigeration plants for refrigeration, as a shielding gas during welding and in the chemical industry, as an inert gas in space technology as a respiration gas during diving, as a carrier gas in chromatography, in the detection of leakages, as a balloon-filling gas and for other purposes as well.

For these purposes, helium with a high degree of purity is required. In order to achieve these high purity levels from gas mixtures containing only low levels of helium, several process steps are necessary to first enrich such mixtures with helium and then to recover high purity helium from this helium-enriched gas mixture.

According to the state of the art, as known from the publication "Bureau of Mines, Preprint from Bulletin 675—Helium—, 1985 Edition, United States Department of Interior", pages 3 and 4, helium is recovered in multistep processes with a purity of 99.9% by volume from helium-containing natural gases. Helium-containing natural gases contain as main components nitrogen and methane, as well as up to 10% by vol. helium, besides lower proportions of various higher-molecular hydrocarbons and carbon dioxide.

Thereby, the natural gas is first cooled down to approximate $-150°$ C. in a cryogenation plant, whereby primarily the hydrocarbons are released by condensation. The co-produced gas mixture contains over 50% by vol. helium, as well as nitrogen, and lower proportions of other gases. This crude helium is then subjected to further dissociation in a pressure swing adsorption installation. Helium with a purity of over 99.9% by volume is recovered. The helium yield of a pressure swing plant oscillates around 60%, whereas the remaining and highly contaminated helium is present in the desorption gas. The desorption gas is subjected to further treatment. After compression, the desorption gas is cooled down to approximate $-185°$ C. in a second cryogenation plant, whereby the contaminants are eliminated by condensation. The remaining mixture of helium and nitrogen is recycled to the pressure swing plant and blended with the crude helium from the first cryogenation unit. Due to recycling, it is possible to recover a high proportion of the helium. One drawback of the process is that it requires two cryogenation plants plus a pressure swing plant. Besides, it is a rather energy-consuming process.

It is the object of the present invention to avoid the drawbacks of the heretofore-known processes and to recover helium of high purity and at high yields from natural gases with a low helium content, exclusively by applying pressure swing adsorption, without any intermediate enrichment in cryogenation plants.

SUMMARY OF THE INVENTION

This object is attained due to the combination of several phases of the adsorption process, thereto pertaining adsorption process steps and adsorption agents.

As adsorbents for the process according to the invention, special carbon molecular sieves are employed with an average adsorption pore diameter between 0.1 and 0.4 nm, preferably between 0.3 and 0.4 nm. These type sieves are extremely effective in separating nitrogen and methane from helium, so that high purity helium can be recovered. Application of the proposed adsorption process phases and steps, first of all achieves an unexpectedly high helium yield of over 90%. This is achieved according to the proposed enrichment process only by applying the pressure swing technique already to initial gas mixtures with a comparatively low helium content of approximate 2-10%, without requiring additionally the use of a cryogenation plant. This way, with very low energy consumption, a product gas is obtained which has a degree of helium purity of 99.9% and higher.

Suitably, the highest pressure level ($P_5$), i.e. adsorption pressure, is over 1 bar, preferably 10-30 bar, and the final vacuum pressure lies under 500 mbar, preferably at 50 mbar.

According to a special embodiment, to the individual pressure levels, the following pressure values are assigned:

$P_1 = 50$ mbar
$P_2 = 1$ bar
$P_3 = 4$ bar
$P_4 = 11.7$ bar
$P_5 = 20$ bar

The duration of the entire operational cycle suitably is 450 to 3600 s.

According to a preferred embodiment, the process is operated with an operational cycle duration of 720 s.

In a process with a general operational cycle duration of 720 s, the pressure relief phase can advantageously comprise the following time intervals:

| | | |
|---|---|---|
| 1. Pressure relief step from $P_5$ down to $P_4$ | 55 s | |
| Rest position | 115 s | |
| 2. Pressure relief step from $P_4$ down to $P_3$ | 10 s | |
| 3. Pressure relief step from $P_3$ down to $P_2$ | 55 s | |
| 4. Pressure relief step from $P_2$ down to $P_1$ | 115 s | |

The pressure build-up phase in a general operational cycle lasting 720 s is suitably subdivided into the following time intervals:

| | |
|---|---|
| 1. Pressure build-up step from $P_1$ to $P_3$ | 10 s |
| 2. Pressure build-up step from $P_3$ to $P_4$ | 55 s |
| 3. Pressure build-up step from $P_4$ to $P_5$ | 125 s |

In a general operational cycle lasting 720 s, it is advisable to select 180 s as the time interval for the recovery of the product gas.

The process according to the invention is particularly suitable for such feed gases whose helium content reaches 10% by vol., preferably 2–8% by vol. Thereby, in the product gas of the first adsorption stage (I), a helium content of up to 95% by vol. can be obtained. The helium content in the final product gas of the second adsorption stage (II) can be 99.9% by volume and higher.

The process according to the invention is particularly suitable for helium recovery from natural gases, which after a preliminary separation from higher-molecular weight hydrocarbons and traces of contaminants for instance in adsorption prefilters known per se, can have the following composition (given in % by volume):

| | |
|---|---|
| $N_2$ | 40–80 |
| He | 2–10 |
| $CH_4$ | 10–40 |
| $CO_2$ | <0.1–10 |

BRIEF DESCRIPTION OF THE DRAWING

Further advantages and aspects of the process will become more evident from the following description of embodiment examples with the aid of the attached drawing wherein:

FIG. 4 is a valve circuit diagram for the four plant adsorbers according to FIG. 1;

FIG. 5 is a diagram showing the dependency of helium yield on the helium purity in a plant (see FIG. 1);

FIG. 7 is a pressure/time diagram and table of process sequences associated with the four adsorbers of step II of the plant as per FIG. 6;

DETAILED DESCRIPTION

Figure 1:
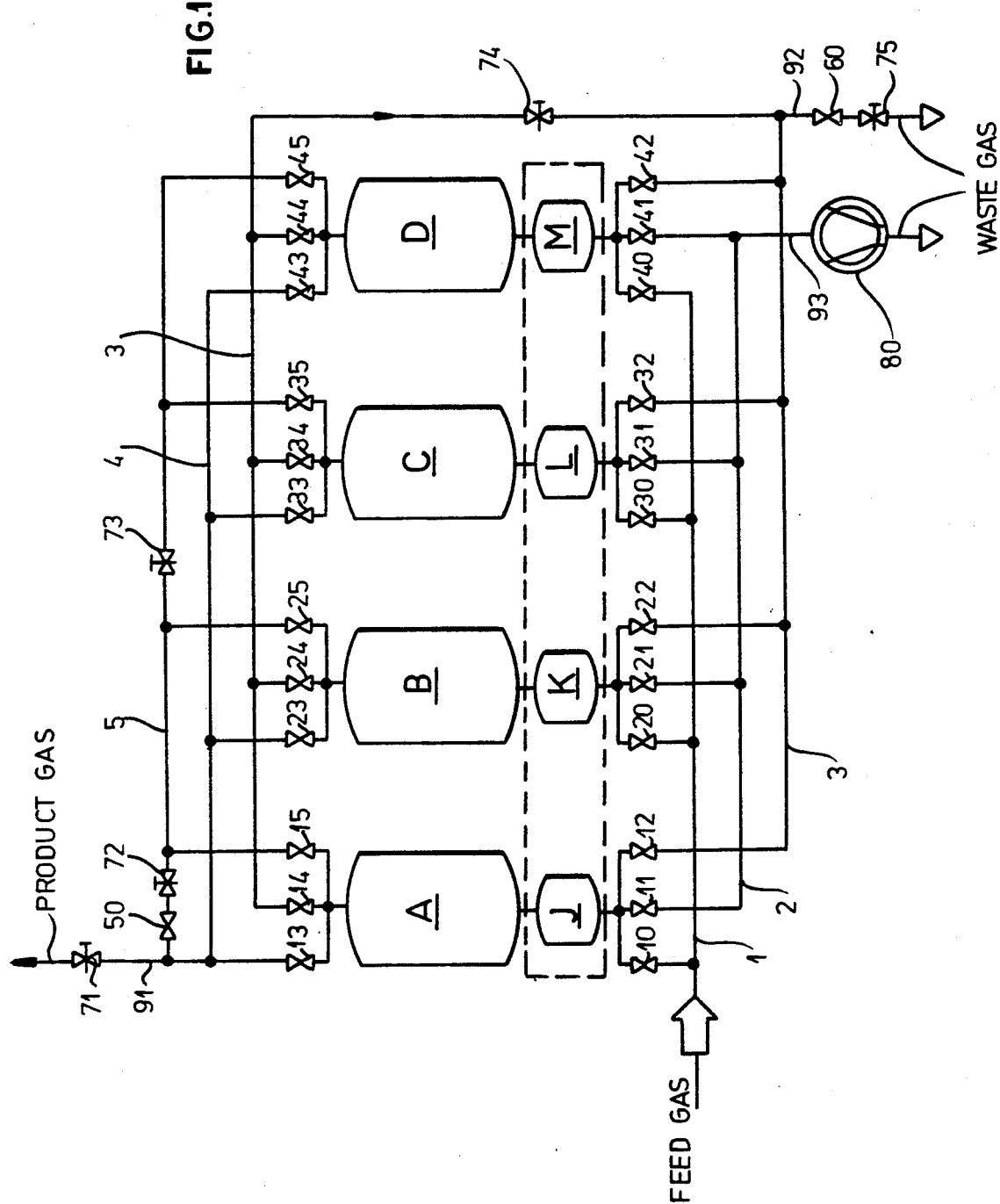
FIG. 1 is a single step helium recovery unit including four adsorbers arranged in parallel, for helium enrichment up to 95% by volume purity.

The plant as per FIG. 1 consists of four adsorbers A through D, arranged in parallel, filled with carbon molecular sieve of an average adsorption pore diameter between 0.1 and 0.4 nm, preferably between 0.3 and 0.4 nm and, as the case may be, of four prefilters J, K, L, M, filled with activated carbon where, if need be, any higher-molecular hydrocarbons and trace contaminants can be removed from the feed gas prior to its entering the adsorbers A through D. Each adsorber passes through the following eight steps in successive cycles and in a staggered time pattern in relation to the remaining three adsorbers:

T1—Adsorption
T2—Pressure relief by compensation (Da 1)
T3—Pressure relief by compensation (Da 2)
T4—Counter-flow pressure relief (GEE)
T5—Evacuation (Ev)
T6—Pressure build-up by compensation (DA 1)
T7—Pressure build-up by compensation (DA 2)
T8—Pressure build-up using product gas (DA 3)

Figure 2:
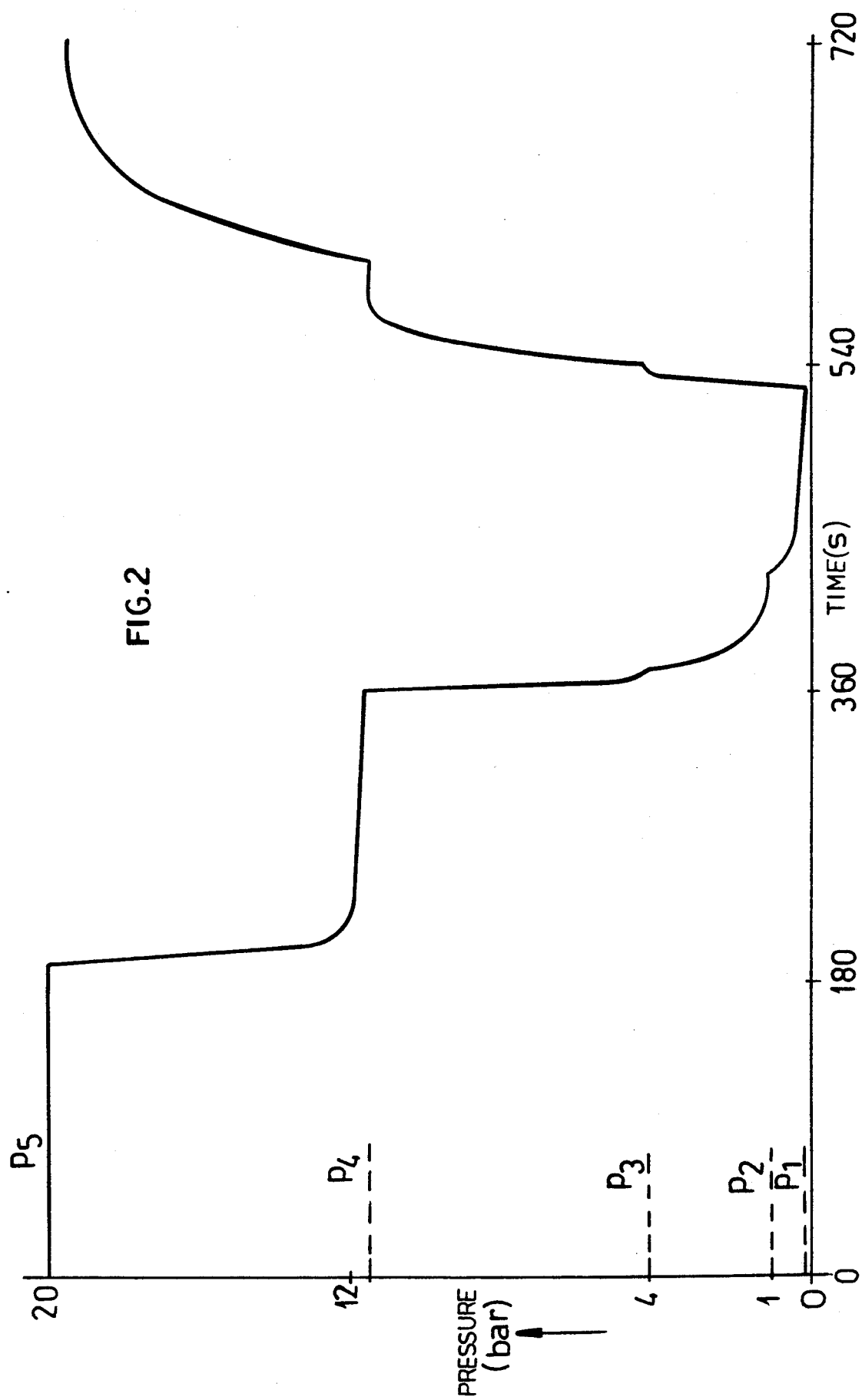
FIG. 2 is a pressure/time diagram of an adsorber within the plant, according to FIG. 1.
Figure 3:
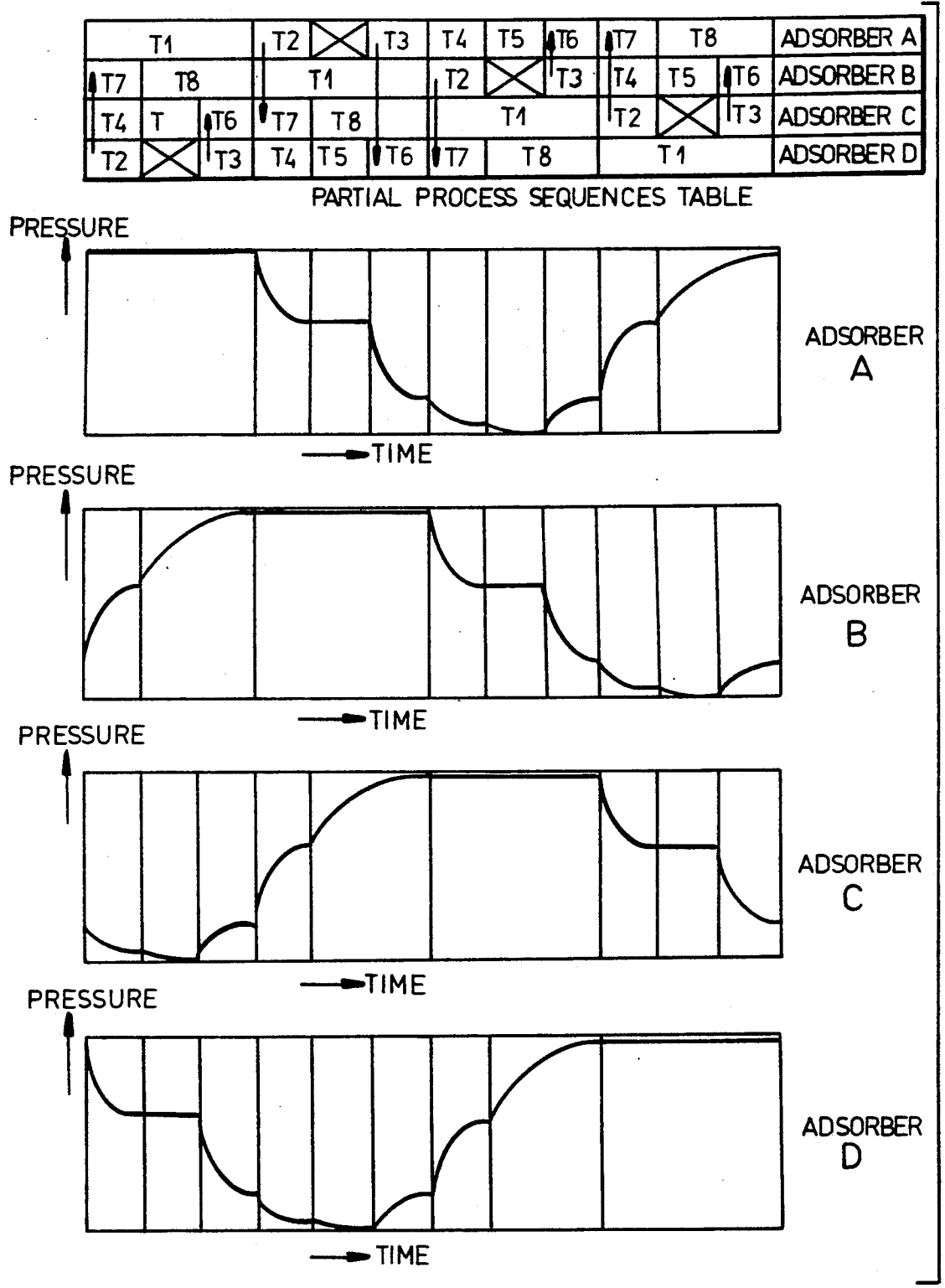
FIG. 3 is a pressure/time diagram and table of process sequences associated with the four plant adsorbers (see FIG. 1)

Before dealing with the details on FIG. 1 we shall first describe the sequence of the eight incremental steps T1 through T8 based on the pressure/time profiles represented on FIGS. 2 and 3.

FIG. 2 shows the typical pressure/time profile for 20 bar adsorption pressure and 720 s overall cycle duration. The profile applies to each of the four adsorbers, with a given staggering in time. On the pressure axis have been plotted the five pressure levels from P1 through P5 between which in our case will take place the pressure build-up, viz. relief steps.

FIG. 3 shows the pressure/time profiles, staggered in time, within the four adsorbers A through D. Hereafter will be described the typical operational cycles going on in adsorber A; identical cycles will be valid for the remaining three adsorbers B, C and D.

Adsorption (step T1) takes place at a constant, increased pressure level, e.g. at 20 bar. At such pressure adsorber A is traversed by the feed gas during which action nitrogen, methane and other gas components are adsorbed by the carbon molecular sieve so that any helium which resists adsorption leaves the adsorber with a high degree of purity.

After an adsorption cycle the loaded adsorber A is subjected to several pressure relief steps (T2 through T5) for regeneration.

Such regeneration starts by a first pressure compensation Da 1 (step T2) during which the gas, being at adsorptive pressure, passes in a parallel flow from adsorber A to adsorber C to be brought down from pressure level $P_5$ to the lower level of $P_3$. The passage of the gas from adsorber A (T2) to adsorber C (T7) has been identified by an arrow in the sequence of process steps as per FIG. 3.

During the first pressure compensation step (Da 1) the pressure in adsorber A is relieved to pressure level $P_4$ (which may be 11.7 bar) whereas the pressure prevailing in adsorber C increases simultaneously from level $P_3$ to level $P_4$ (pressure build-up DA 2).

After a short rest position (standby) a second pressure compensation (DA 2, step T3) takes place in adsorber A when the gas, being at pressure level $P_4$, leaves adsorber A (again in a parallel flow) to be passed for pressure relief to the adsorber D which is at vacuum pressure $P_1$. All the while the pressure $P_4$ prevailing in adsorber A drops to level $P_3$ which may be 4 bar. During both of the pressure compensation steps a helium-enriched gas mixture will flow from adsorber A to adsorber C, viz. to adsorber D.

Following the two pressure compensation steps (Da 1 and Da 2) adsorber A will, by counter-flow, continue to be relieved, this time from level $P_3$ to ambient pressure $P_2$ (GEE, step T4). All the while a gas mixture low in helium is yielded which is rather high in nitrogen and methane and other components having been desorbed during counter-flow relief (GEE); this gas mixture is discarded.

Hereafter adsorber A will be evacuated by vacuum pump 80 to a vacuum pressure $P_1$ of e.g. 50 mbar (Ev, step T5). During this procedure nitrogen and methane as well as other gas components having been adsorbed during the prior step T1 will increasingly become desorbed. The evacuated gas is extremely low in helium and therefore discarded as well.

With the evacuation step, regeneration of adsorber A is completed where now the pressure will gradually be built up by steps T6 through T8 until having arrived at adsorption pressure $P_5$.

The first pressure compensation (step T6) takes place between adsorber A and adsorber B which latter has just passed through step T2 and is (evacuation of adsorber A nearing completion) at a higher intermediate pressure $P_4$. During pressure compensation, a helium-enriched gas mixture flows from adsorber B to adsorber A, this mixture being withdrawn from adsorber B preferably in a parallel flow to enter adsorber A likewise in a parallel flow (top/bottom pressure compensation). All the while pressure in adsorber A (build-up DA 1) rises from the final vacuum pressure $P_1$ to an intermediate level $P_3$ which may be at 4 bar, whereas simultaneously the intermediate pressure level $P_4$ prevailing in adsorber B will drop to the lower intermediate level $P_3$.

The following pressure compensation (step T7) with adsorber C helps to further increase the pressure in adsorber A (build-up DA 2). Prior to that compensation adsorber C has passed through step T1 (adsorption) and is on the point of being pressure-compensated with adsorber A which latter is at the adsorption pressure level $P_5$. In the example quoted, pressure compensation is done in such a way that the helium-enriched gas mixture is withdrawn in a parallel flow from adsorber C to be relieved by entering adsorber A in a counter-flow (top/top pressure compensation). All the while the pressure in adsorber A rises from an intermediate level $P_3$ to the nextmost level $P_4$ which may be at 11.7 bar, whereas at the same time the adsorption pressure $P_5$ prevailing in adsorber C drops to the intermediate level $P_4$.

After this double pressure compensation, product gas is used to increase the pressure in adsorber A from the higher intermediate level $P_4$ to the adsorption pressure level $P_5$ (e.g. 20 bar) (build-up DA 3, step T8), after which will start another adsorption step in adsorber A (step T1).

As shown on FIG. 1 the four adsorbers A through D are switched via a number of valves in such a way that one of the four is always at adsorption pressure to produce helium of high purity as product gas. FIG. 4 represents the switching circuit of the valves. The following is to explain, based on FIGS. 4 and 1 and taking adsorber A as an example, the supply and abduction of gases in the pressure swing adsorption plant as represented on FIG. 1. The adsorbers A through D may be preceded by prefilters J, K, L, M which are a technical standard and serve for the preliminary removal of highly adsorbing gas constituants of higher-molecular weight hydrocarbons from oil well gases. As shown by the example, filter operation normally is similar to that of the filters at the subsequent main adsorbers A through D arranged in series, any further explanation therefore not being here discussed.

Upon pressure build-up by product gas (DA 3, step T8), adsorber A is at adsorption pressure $P_5$. During subsequent adsorption (step T1) feed gas arrives through line 1 at a pressure which, for overcoming the pressure drop within the plant, is slightly above adsorption pressure, with open valves 10 and 13 arranged in flow direction before viz. behind adsorber A, and flows through adsorber A. With the exception of helium, all the other constituents of the feed gas, such as nitrogen and methane, will be adsorbed onto the carbon molecular sieve. A helium-enriched gas thereby leaves the top of adsorber A via line 4 and needle valve 71 (adjusting valve) to be discharged through a product gas line 91. The adsorption is subdivided in three time steps Z1, Z2 and Z3 matching with the valve circuit diagram on FIG. 4. During step Z1 a valve 50 arranged in line 5 is closed so that all of the product gas enters the product gas line 91 via line 4. During steps Z2 and Z3, valve 50 opens so that part of the product gas enters the adsorber B via a subsequent choke 72, via line 5 and the open valve 25 preceding adsorber B which latter, under the action of the product gas having entered during step T8, is boosted from the intermediate pressure level $P_4$ to adsorption pressure $P_5$. The duration of time steps Z1, Z2 and Z3 may, with an overall cycle duration of 720 s, amount to 55 s for step Z1, 115 s for step Z2 and 10 s for step Z3.

Adsorber A will, after its adsorptive phase, be pressure-relieved by step T2 (Da 1) to the higher intermediate level $P_4$ during which the gas discharged from adsorber A whose valve 15 has opened (while valve 50 is closed) arrives for top/top pressure compensation via choke 73 in line 5, with open valve 35, at adsorber C which, in turn, is now subjected to step T7 whereby it is boosted from intermediate pressure $P_3$ to a higher intermediate level $P_4$. According to the valve circuit diagram on FIG. 4 such pressure compensation (Da 1) takes the time step Z1 which in our example lasts for 55 s, with an overall cycle of 720 s.

Upon the aforesaid first pressure compensation and rest position (standby) which latter, for an overall cycle of 720 s, accounts for 115 s, adsorber A is further relieved by step T3 (Da 2) via another pressure compensation with adsorber D, i.e. brought down from the higher intermediate level $P_4$ to the lower intermediate level $P_3$. To this end, gas from adsorber A is led, with valves 14 and 42 opened, via a ring line 3 (valve 60 in line 92 closed) and via choke 74, to adsorber D which latter, in turn, is being subjected to step T6 and boosted from its final vacuum pressure $P_1$ to the intermediate level $P_3$. The pressure compensation in our case happens therefore in a top/bottom mode. According to the valve circuit diagram on FIG. 4 the pressure compensation Da 2 lasts for the time span Z3 which in the quoted example takes 10 s of an overall cycle of 720 s.

Thereafter the pressure prevailing in adsorber A is further reduced by step T4 (GEE) in a counter-flow, with opened valves 12 and 60, via choke 75, from the intermediate level $P_3$ down to ambient pressure $P_2$. The gas discharged during this enters a waste gas line 92. In our example, the counter-flow pressure relief lasts 55 s on a total cycle of 720 s.

Upon counter-flow pressure relief, adsorber A will be evacuated by steps T5 (Ev), with opened valve 11, by means of vacuum pump 80, from ambient pressure $P_2$ until having arrived at a final vacuum pressure $P_1$ which may be 50 mbar. The gas mixture low in helium withdrawn during evacuation enters waste gas line 93. In our example, evacuation takes 115 s on an overall cycle of 720 s.

Thereafter the evacuated adsorber A is, by step T6 (DA 1), brought from its final vacuum pressure $P_1$ to intermediate pressure $P_3$ in a compensation with adsorber B. The step is effected preferably as top/bottom pressure compensation. During this a helium-enriched gas mixture is pressure-relieved by passing from the outlet of adsorber B, with the valves 24 and 12 open (valve 60 being closed), via ring line 3 and choke 74 to the inlet of adsorber A. All the while adsorber B passes through step T3. During pressure compensation the pressure in adsorber B drops from an intermediate level $P_4$ to the lower intermediate level $P_3$. Pressure compensation DA 1 takes 10 s on an overall cycle of 720 s duration.

Adsorber A, now boosted to the intermediate pressure level $P_3$, is hereafter subjected to further pressure build-up by step T7 (DA 2) bringing it to intermediate level $P_4$ in another pressure compensation with adsorber C. This compensation is carried out preferably in the top/top mode so that a helium-enriched gas mixture becomes destressed passing from the outlet of adsorber C with open valves 35 and 15 via choke 73 in line 5, to the outlet of adsorber A. All the while adsorber C is subjected to step T2 whereby pressure in adsorber C drops from adsorption pressure $P_5$ to an intermediate level $P_4$. Pressure compensation DA 2 takes 55 s on an entire cycle of 720 s duration.

Finally adsorber A is boosted by step T8 (DA 3) using product gas to bring it from the intermediate level $P_4$ to adsorption pressure $P_5$. To this end part of the product gas is passed to adsorber A via choke 72 and open valves 50 and 15. According to the valve circuit diagram on FIG. 4 pressure build-up DA 3 is composed of the two time steps Z2 and Z3 taking 115 viz. 10 s on an overall cycle of 720 s.

Upon pressure build-up DA 3 using product gas another pressure swing cycle starts in adsorber A, commencing again by the adsorption step. The pressure swing cycle in the adsorbers B, C and D runs accordingly, although staggered in time, as can be taken from FIG. 3. Respective valve arrangements 20, 21, 22, 23, 30, 31, 32, 33, 34, 40, 41, 43, 44, 45 and 95 for adsorbers B, C and D operate in similar sequence to those associated with adsorber A as hereinabove described and illustrated in FIG. 4.

As was described earlier, regeneration of the adsorbent is brought about by an evacuation step although with the present state of the art the gas constituents, e.g. nitrogen and methane, to be removed from the helium-containing feedgas could be removed by product gas flushing. Such flushing desorption would, however, lead to unacceptably high helium yield losses in the case of helium recovery from natural gas and oil well gases since given the low helium content in the feedgas the product gas yield in the form of high purity helium gas is modest, with large gas volumes having to be desorbed at the same time, the gas constituents having to be removed by adsorption and re-desorbed again accounting for at least 92% by vol. of the feedgas.

EXAMPLES

In a pressure swing plant on a laboratory scale, according to FIG. 1 (however excluding the prefilters J, K, L, M), applying an adsorption pressure of 20 bar, a final vacuum pressure of 50 mbar and an overall cycle duration of 720 s corresponding to 5 cycles/h, separation experiments were carried out using a gas mixture containing no contaminants, e.g. higher hydrocarbons, but only helium (about 5% by vol.), methane (about 29% by vol.) and nitrogen (about 66% by vol.). The four adsorbers A through D were filled with carbon molecular sieve of an average adsorptive pore diameter of 0.35 nm; their filling capacity amounted to 2 l/adsorber. During the experiments the volume of product gas was adjusted by setting of the needle valve 71 whereby the degree of helium purity in the product gas was varied at the same time. The test results summarize in Tables 1 through 4 below support the doctrine of the invention that helium can, indeed, be enriched to a helium purity between 75 and 95% by vol. in the product gas, starting from a feedgas containing <8% by vol. helium, with, depending on the helium purity in the product gas, a helium yield between 90–99.9% being attained. The experimental results are laid down in the form of a complete mass balance.

TABLE 1

| | Concentration (% by vol.) | | | Volume |
|---|---|---|---|---|
| | He | CH$_4$ | N$_2$ | (Nl/h) |
| Feedgas | 5,1 | 28,9 | 66,0 | 602,2 |
| Evacuation waste gas | 0,7 | 23,1 | 76,2 | 191,3 |
| Waste gas from counter-flow relief | 0,5 | 34,0 | 65,5 | 381,7 |
| Product gas | 95,0 | — | 5,0 | 29,9 |

From the above can be computed a helium yield of 90.3%.

TABLE 2

| | Concentration (% by vol.) | | | Volume |
|---|---|---|---|---|
| | He | CH$_4$ | N$_2$ | (Nl/h) |
| Feedgas | 5,3 | 28,9 | 65,8 | 593,6 |
| Evacuation waste gas | 0,2 | 23,8 | 76,0 | 188,5 |
| Waste gas from counter-flow relief | 0,2 | 34,1 | 65,7 | 371,5 |
| Product gas | 90,0 | — | 10,0 | 33,6 |

From the above can be computed a helium yield of 96.1%.

TABLE 3

| | Concentration (% by vol.) | | | Volume |
|---|---|---|---|---|
| | He | CH$_4$ | N$_2$ | (Nl/h) |
| Feedgas | 5,1 | 28,6 | 66,3 | 604,1 |
| Evacuation waste gas | — | 24,5 | 75,5 | 190,4 |
| Waste gas from counter-flow relief | <0,1 | 33,7 | 66,2 | 375,2 |
| Product gas | 80,0 | — | 20,0 | 38,5 |

From the above can be computed a helium yield of 99.9%.

TABLE 4

|  | Concentration (% by vol.) | | | Volume |
|---|---|---|---|---|
|  | He | CH$_4$ | N$_2$ | (Nl/h) |
| Feedgas | 5,4 | 28,5 | 66,1 | 609,4 |
| Evacuation waste gas | — | 26,0 | 74,0 | 194,1 |
| Waste gas from counter-flow relief | <0,1 | 33,1 | 66,8 | 372,4 |
| Product gas | 76,4 | — | 23,6 | 42,9 |

From the above can be computed a helium yield of 99.6%.

Figure 6:
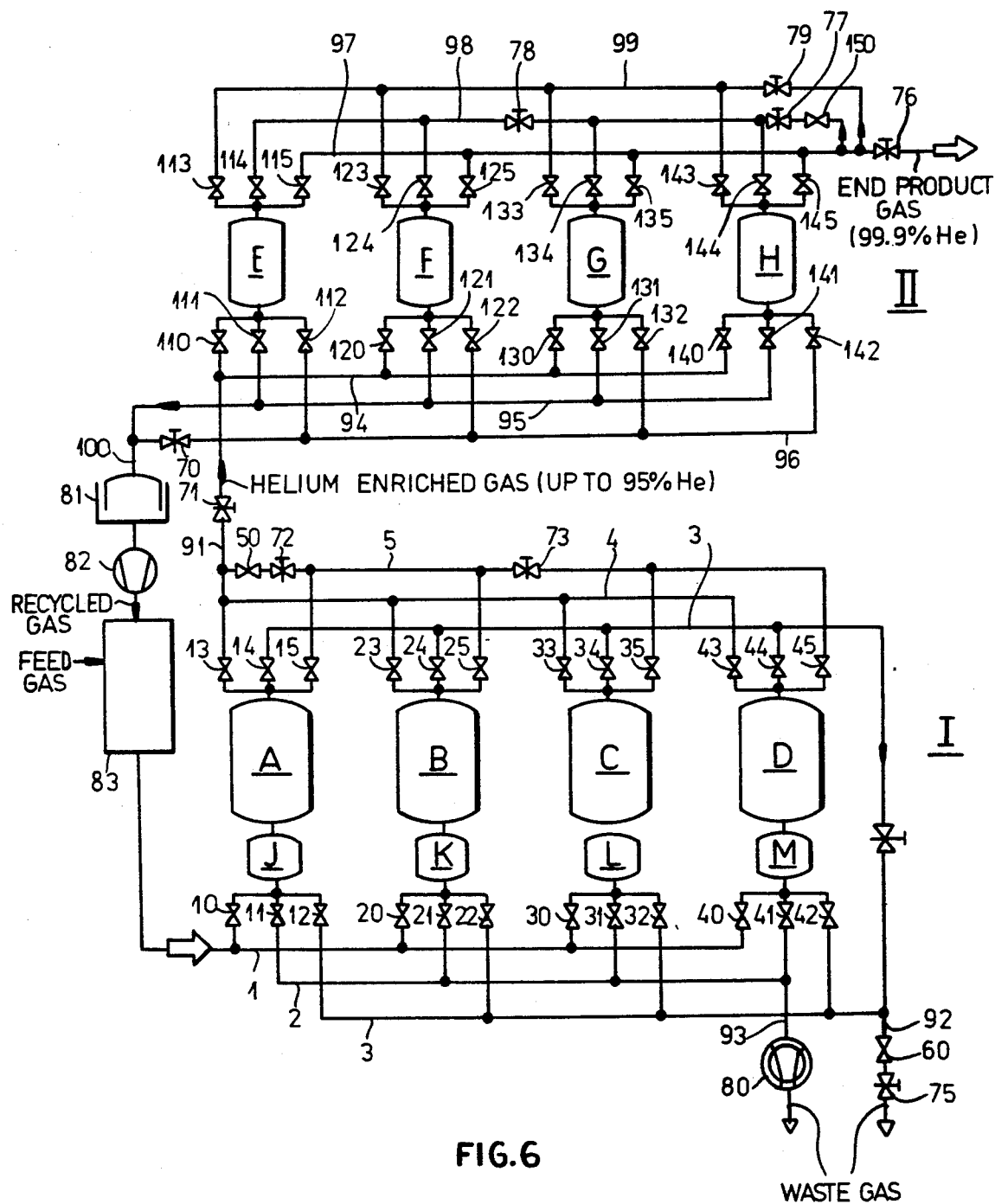
FIG. 6 is a dual-step adsorption plant including four parallel adsorbers for each step for the recovery of helium of more than 99.9% by vol.

The helium yield will go back with rising purity, and vice versa. The interdependence of helium purity and helium yield has been represented in FIG. 5. Higher helium purity of as much as >99.9% by vol. and at the same time high helium yield can be attained when the helium rich gas exhibiting helium concentrations up to 95% by vol., as produced in the pressure swing plant I (according to FIG. 1) is subjected to further dissociation in a subsequent pressure swing plant II. Helium-containing waste gas is recycled to pressure swing plant I to be blended with the feedgas to that latter plant, for dissociation. FIG. 6 shows the flowsheet of the two successive pressure swing plants I and II.

Same as the first pressure swing plant I which is equipped with four adsorbers A through D, pressure swing plant II comprises four adsorbers E through H filled with a carbon molecular sieve of an average adsorption pore diameter of 0.35 nm. The process taking place in the subsequent pressure swing plant II is composed of six steps T1.2 through T6.2 traversed successively by each of the adsorbers E through H in a cycle which is staggered against the remaining three adsorbers:

T1.2—Adsorption
T2.2—Pressure relief by compensation (Da 1)
T3.2—Counter-flow relief (GEE)
T4.2—Flushing with product gas
T5.2—Pressure build-up by compensation (DA 1)
T6.2—Pressure build-up by product gas (DA 2)

The cyclical and staggered progress of the six steps T1.2 through T6.2 within the four adsorbers E through H is illustrated by the pressure/time profiles on FIG. 7. Steps T1.2 through T6.2 develop in a way that always one of the adsorbers is at adsorption pressure and produces high purity helium as product gas. This ensures a continuous production of high purity helium. The appertaining valve circuit sequence is represented on FIG. 8.

Figure 8:
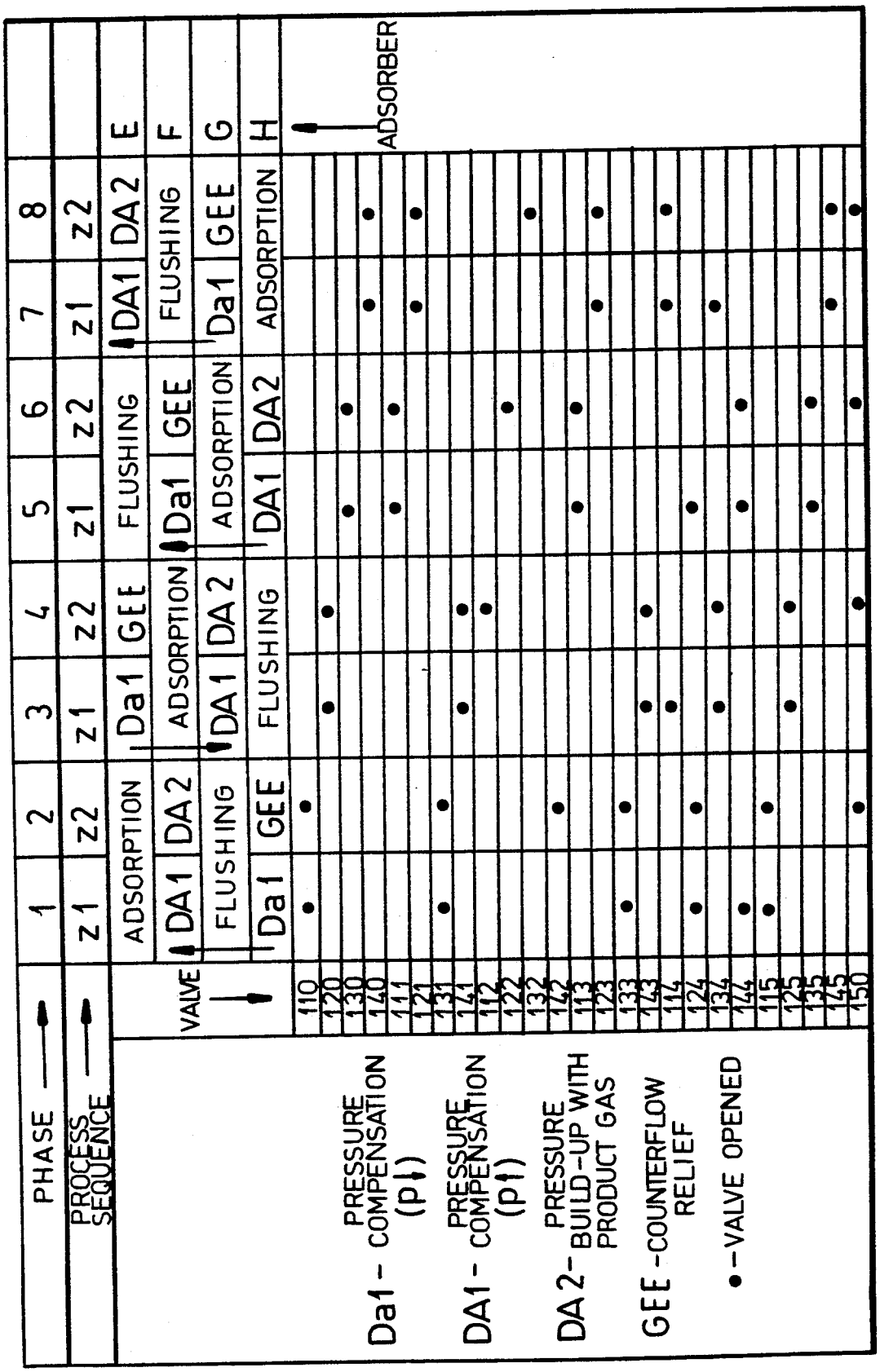
FIG. 8 is a valve circuit diagram for the four plant adsorbers of step II, as per FIG. 6.

With the aid of FIGS. 6 and 8, there follows an explanation concerning the gas routing within pressure swing plant II, taking adsorber E as example. For purposes of discussion the product gas yielded by pressure swing plant I and recycled as a feedgas to pressure swing plant II is referred to as helium-rich gas (helium content up to 95% by vol.) whereas the product gas leaving pressure swing plant II (high purity helium having a helium content of beyond 99.9% by vol.) is referred to a final product gas.

Upon pressure build-up with final product gas to an increased pressure level of $P_{3.2}$, adsorber E has attained the adsorption pressure of the subsequent pressure swing plant II, a pressure which may be lower than or equal to the adsorption pressure $P_5$ in the preceding pressure swing plant I. In the first case, the helium rich gas can be compressed by an intermediate compressor (not shown) from $P_5$ to $P_{3.2}$. In the second case the helium rich gas can be destressed e.g. by some intermediate pressure-reducing device (not shown) from $P_5$ down to $P_{3.2}$. FIG. 6 represents a plant where the adsorptive pressures $P_5$ and $P_{3.2}$ are identical. Upon pressure build-up and during the subsequent adsorption by step T1.2 helium rich gas flows via line 94, with opened valves 110 and 115 and at pressure of $P_{3.2}$, through adsorber E. Residual contaminations, namely nitrogen, are hereby removed by adsorption from the helium rich gas so that high purity helium, of a purity better than 99.9% by vol., leaves the plant as final product gas via line 97 and needle valve 76 (adjusting valve) at a pressure which due to the preceding pressure losses is slightly below $P_{3.2}$. Depending on the application envisaged, the high purity helium may either be directly used or be compressed to high pressure for storage and/or further transport in containers or gas cylinders or, alternatively, fed to pipelines (after secondary compression, if need be) or still be liquefied in cryogenation units.

Upon adsorption, adsorber E will be relieved during step T2.2 by compensation (Da 1) with adsorber G down to an intermediate pressure level $P_{2.2}$. To this end the adsorbers E and G are made to communicate by opening of valves 114 and 134 (valve 150 is closed) so that helium rich gas is relieved passing from adsorber via line 98 and choke 78 to enter the (flushed) adsorber G which during this action is boosted from flushing pressure $T_{1.2}$ to the intermediate level $P_{2.2}$. Such pressure compensation is done preferably in a top/top mode.

Upon pressure compensation (Da 1) adsorber E is relieved by step T3.2, in a counter-flow down to the minimum pressure $P_{1.2}$ (GEE) which is preferably at ambient pressure. To this end valve 112 is opened. The gas mixture being discharged thereby from adsorber E exhibits a helium content which is substantially above that of the feedgas entering the preceding pressure swing plant I; for this reason the gas mixture is recycled to the inlet of the preceding pressure swing plant I via line 96 and choke 70. During this the relieved gas whose constitution and volume flow change during the relieving action, is first passed to a buffer 81 arranged in line 100 for homogenization and there blended with the flushing waste gas yielded by step T4.2 and likewise recycled in order to be compressed thereafter, via circuit compressor 82, to adsorption pressure $P_5$ of the first pressure swing plant I and then pressed into a blending tank 83 where the recycling gas from pressure swing plant II is blended to the feedgas going to pressure swing plant I.

Thereafter adsorber E is flushed, by step T4.2, which is the final product gas and at the final pressure of counter-flow relief $P_{1.2}$, for regeneration of the spent adsorbent. To this end a partial flow of the final product gas is passed in a counter-flow through adsorber E via line 99 and choke 79, with valves 113 and 111 open. The contaminants, mainly nitrogen, having been removed from the helium rich gas will be desorbed during flushing. Even the flushing gas discharged from the adsorber bottom has a helium content which is substantially greater than that of the feedgas. The flushing waste gas is therefore also recycled to the inlet of the first pressure swing plant I, i.e. in a similar way as has been described earlier for the gas relieved by counter-flow. After flushing, the adsorber E is boosted by step T5.2, pressure compensation with adsorber G having passed through its adsorptive phase, to an intermediate pressure level $P_{2.2}$. To this end, valves 114 and 135 open (valve 150 is closed) so that helium rich gas from adsorber G is relieved by passing via line 98 and choke 78 to adsorber E. All the while the adsorption pressure $P_{3.2}$ having prevailed in adsorber G drops to the intermediate level $P_{2.2}$.

Finally adsorber E is boosted by the last step T6.2, using the final product gas, to adsorption pressure $P_{3.2}$. For the purpose a partial flow of the final product gas is passed via line 98, with open valves 150 and 114, and via chokes 77 and 78, to adsorber E. Upon which another pressure swing cycle starts with the adsorption phase in adsorber E. The pressure swing cycle in the adsorbers F, G and H takes place in a similar way, although staggered in time, as can be taken from FIG. 7. Respective valve arrangements 120, 121, 122, 123, 124, 125, 130, 131, 132, 133, 140, 141, 142, 143, 144 and 145 for adsorber F, G and H operate in similar sequence to those associated with adsorber E as hereinabove described and illustrated in FIG. 8.

The overall cycle duration in the subsequent pressure swing plant II may be selected independently from that of pressure swing plant I. It may be selected either longer, shorter, or equal, depending on the purity of the helium rich gas and on the adsorption pressures $P_5$ viz. $P_{3.2}$ selected. As a function of the entire cycle duration time requirements vary for the steps T1.2 through T6.2. For an entire cycle duration of let us say 1600 s and the following time arrangement, high helium purity and at the same time high helium yields were attained:

| | |
|---|---|
| Adsorption | 400 s |
| Pressure compensation Da 1.2 | 200 s |
| Counter-flow pressure relief | 200 s |
| Flushing | 400 s |
| Pressure compensation DA 1.2 | 200 s |
| Pressure build-up DA 2.2 | 200 s |

Alternative time subdivisions are possible.

EXAMPLE

A second and smaller laboratory pressure swing plant II (4 adsorbers of a filling volume of 0.15 l/adsorber) was arranged behind the laboratory pressure swing plant I (4 adsorbers A through D of a filling capacity of 2 l/adsorber) which has already been described and was used for the experiments 1 through 4. Plant number II was used to further dissociate the helium rich gas produced in the first pressure swing plant I. The lay-out of the entire plant was represented in FIG. 6 (although excluding prefilters in plant I). The gas mixture yielded in the subsequent pressure swing plant II during counter-flow pressure relief and flushing, was recycled as per FIG. 6 to the inlet of the first pressure swing plant I. The adsorbers of both units were filled with a carbon molecular sieve of average adsorption pore diameter of 0.35 nm. The first pressure swing plant I was operated, similar to the experiments 1 through 4, at an adsorption pressure of 20 bar final vacuum pressure of 50 mbar, and an overall cycle duration of 720 s. The adsorption pressure in the subsequent pressure swing plant II was 20 bar as well, its overall cycle duration was approx. 1600 s.

In the first pressure swing plant I was produced a helium rich gas of 79.5% by vol. helium concentration to be subjected to a secondary treatment in pressure swing plant II to give a high purity helium of better than 99.9% by vol. helium content. The volumes and constitutions of the different partial gas flows are summarized in the following tables.

TABLE 5

| | Concentration (% by vol.) | | | |
|---|---|---|---|---|
| | He | $CH_4$ | $N_2$ | |
| Step I | | | | |
| Feedgas | 5,4 | 28,5 | 66,1 | 592, |
| Recycling gas from second step | 41,5 | — | 58,5 | 17,1 |
| Product gas | 79,5 | — | 20,5 | 48,9 |
| Waste gas from counter-flow pressure relief | <0,1 | 32,6 | 67,4 | 368,1 |
| Waste gas from evacuation | — | 25,5 | 74,5 | 192,4 |
| Step II | | | | |
| Feedgas | 79,5 | — | 20,5 | 48,9 |
| Final product gas | >99,9 | — | <0,1 | 31,7 |
| Gas from counter-flow pressure relief[1] | 43,6 | — | 56,4 | 14,0 |
| Gas from flushing[1] | 32,2 | — | 67,8 | 3,1 |

[1]Gas to be recycled to step I

From 592,3 l/h (STP) feedgas containing 5.4% by vol. helium was obtained 31.7 l/h (STP) high purity helium of a purity better than 99.9% by vol. From this can be computed a helium yield of 99.1% for the dual-step helium enrichment by means of pressure swing adsorption and integrated gas recycling.

We claim:
1. A method for helium recovery according to a pressure swing adsorption process from a gas mixture comprising helium, nitrogen and methane, said method comprising:
   (a) directing said gas mixture through a plurality of prefiltering adsorbers filled with activated carbon thereby removing higher molecular weight hydrocarbons and other contaminants to provide a helium enriched gas composition;
   (b) conveying said enriched gas composition from said prefiltering adsorbers to a plurality of respective stage I adsorbers arranged in parallel;
   (c) cyclically feeding said enriched gas composition through said plurality of stage I adsorbers to accomplish a first adsorption stage, said adsorbers being filled with carbon molecular sieves with an average adsorption pore diameter ranging between 0.1 and 0.4 nm for removing nitrogen and methane, said first adsorption stage comprising a multistep pressure build-up phase and a multistep pressure relief phase after adsorption, wherein:
   (c, a) said pressure build-up phase comprises:
   1. a pressure build-up step from a final vacuum pressure ($P_1$) to a medium pressure level ($P_3$);
   2. a pressure build-up step from said medium pressure level ($P_3$) to a higher pressure level ($P_4$);
   3. a pressure build-up step from said higher pressure level ($P_4$) to a highest pressure level ($P_5$);
   (c, b) said pressure relief phase comprises:
   1. a pressure relief step from said highest pressure level ($P_5$) down to said higher pressure level ($P_4$);
   2. a pressure relief step from said higher pressure level ($P_4$) to said medium pressure level ($P_3$);
   3. a pressure relief step from said medium pressure level ($P_3$) to an ambient pressure ($P_2$);

4. a pressure relief step from said ambient pressure level (P$_2$) to said final vacuum pressure (P$_1$);

(c, c) pressure compensation taking place in a first compensation step occurring between an outlet of a first of said stage I adsorbers which performs said pressure relief step (1) from P$_5$ down to P$_4$ and between an outlet of a second of said stage I adsorbers performing said pressure build-up step (2) from P$_3$ to P$_4$, and a second compensation step occurring between an outlet of said first adsorber which performs said pressure relief step (2) from P$_4$ down to P$_3$ and said inlet of a third stage I adsorber performing said pressure build-up step (1) from P to P$_3$; and (c, d) said pressure relief steps (3) and (4) occurring in counterflow whereby a helium-poor waste gas results and said pressure build-up step (3) is performed with a product gas;

(d) cyclically feeding said product gas coming from said first adsorption stage to a plurality of stage II adsorbers arranged in parallel, said stage II adsorbers also being filled with said carbon molecular sieves, said product gas being successively alternately subjected in each stage II adsorber to a pressure build-up, an adsorption and a regeneration phase, said pressure build-up phase being performed through pressure compensation with molecular sieve material to be regenerated and then with pressure from said product gas, and said regeneration phase beginning with pressure compensation followed by pressure relief and flushing with said product gas, and upon completion of traverse through said stage II adsorbers there results a waste gas which is recycled for further treatment in said first adsorption stage.

2. The method according to claim 1 wherein said molecular sieves have an average adsorption pore diameter between 0.3 and 0.4 nm.

3. The method according to claim 1 wherein said highest pressure level P$_5$ is greater than 1 bar and said final vacuum pressure is under 500 mbar.

4. The method according to claim 3 wherein said pressure levels are:
P$_1$ = 50 mbar
P$_2$ = 1 bar
P$_3$ = 4 bar
P$_4$ = 11.7 bar
P$_5$ = 20 bar.

5. The method according to claim 1 wherein said highest pressure level P$_5$ ranges from 10 to 30 bar.

6. The method according to claim 1 wherein an entire operational cycle has a duration between 450 to 1600 s.

7. The method according to claim 6 wherein said pressure relief phase in an operational cycle lasting 720 s comprises the following time intervals:

| | |
|---|---|
| 1. Pressure relief step from P$_5$ down to P$_4$ | 55 s |
| Rest position | 115 s |
| 2. Pressure relief step from P$_4$ down to P$_3$ | 10 s |
| 3. Pressure relief step from P$_3$ down to P$_2$ | 55 s |
| 4. Pressure relief step from P$_2$ down to P$_1$ | 115 s. |

8. The method according to claim 6 wherein said pressure build-up phase in an operational cycle lasting 720 s comprises the following time intervals:

| | |
|---|---|
| 1. Pressure build-up step from P$_1$ to P$_3$ | 10 s |
| 2. Pressure build-up step from P$_3$ to P$_4$ | 55 s |
| 3. Pressure build-up step from P$_4$ to P$_5$ | 125 s. |

9. The method according to claim 6 wherein recovery of said product gas covers a time interval of 180 s, in a general operational cycle lasting 720 s.

10. The method according to claim 1 wherein helium is present in said gas mixtures directed into stage I in less than 10% by volume.

11. The method according to claim 10 wherein said helium is present in said gas mixtures directed into stage I in a concentration between 2 to 8% by volume.

* * * * *